United States Patent [19]

Bremer

[11] Patent Number: 4,654,807
[45] Date of Patent: Mar. 31, 1987

[54] METHOD OF MEASURING COMMUNICATION CHANNEL IMPAIREMENT IN POLLING APPLICATIONS

[75] Inventor: Gordon Bremer, Clearwater, Fla.

[73] Assignee: Paradyne Corporation, Largo, Fla.

[21] Appl. No.: 558,611

[22] Filed: Dec. 6, 1983

[51] Int. Cl.[4] .............................................. H04B 3/46
[52] U.S. Cl. ..................................... 364/551; 371/22; 375/10; 364/514
[58] Field of Search ....................... 364/514, 550, 551; 371/22, 25; 370/15, 17; 179/175; 375/10

[56] References Cited

U.S. PATENT DOCUMENTS

| | | |
|---|---|---|
| 4,034,195 | 7/1977 | Bates ..................................... 371/22 |
| 4,055,808 | 10/1977 | Holsinger et al. ..................... 375/10 |
| 4,069,402 | 1/1978 | Mantouani et al. ................... 371/22 |
| 4,385,384 | 5/1983 | Rosburg et al. ....................... 371/22 |
| 4,419,751 | 12/1983 | Cholat-Namy ....................... 370/17 |
| 4,516,216 | 5/1985 | Armstrong ........................... 364/514 |

Primary Examiner—Gary Chin
Attorney, Agent, or Firm—Kane, Dalsimer, Sullivan, Kurucz

[57] ABSTRACT

This invention provides a method of measuring the characteristics of the channel of a communication system using modems without automatic equalization. The method consists of preceeding a data string sent between modems by a set of TRAINING signals followed by a set of TEST signals. Preferably the TEST signals are chosen to eliminate intersymbol interference on the channel, so that the signals do not have to be equalized.

2 Claims, 3 Drawing Figures

METHOD OF MEASURING COMMUNICATION CHANNEL IMPAIREMENT IN POLLING APPLICATIONS

BACKGROUND OF THE INVENTION

This invention relates to a method of using modems to measure impairment of communication lines.

Improvements have been made in modem designs which have expanded the range of usefulness of such equipment. Some of these improvements enable modems to monitor or measure certain characteristics of the communications line connected to the modem, such as the signal-to-noise ratio and phase jitter. One such monitoring system is described in the commonly assigned application Ser. No. 376,741 filed on May 10, 1982 now U.S. Pat. No. 4,516,216. Usually such systems are capable of analyzing the line while data is being transmitted, but without interfering with said data. The systems have been found to be very accurate in modems having automatic or adaptive equalization. However, these monitoring systems lose their effectiveness in modems which do not have automatic equalizers because they do not have means for adequately eliminating receiver intersymbol interference caused by linear distortions of the channel.

OBJECTIVES AND SUMMARY

Therefore it is an objective of the present invention to provide a method of data communication which would allow the use of on-line channel monitoring equipment in unequalized modems by eliminating the effects of intersymbol interference.

Another objective of the invention is to provide a method of data communication in a polling system having a master site and several remote sites for selectively testing each master-to-remote channel and for identifying said channel.

Other objectives and advantages shall become apparent in the preferred embodiment of the invention.

According to this invention, the characteristics of the communication channel in a system having modems without equalization are measured by sending training signals from a first to a second modem via said channel followed by a series of test signals. The characteristics of said channel are measured by analyzing said test signals. The test signals are selected so that there is no intersymbol interference between any two consecutive signals thereby eliminating the need for equalization.

DESCRIPTION OF THE PREFERRED EMBODIMENT

Figure 1:
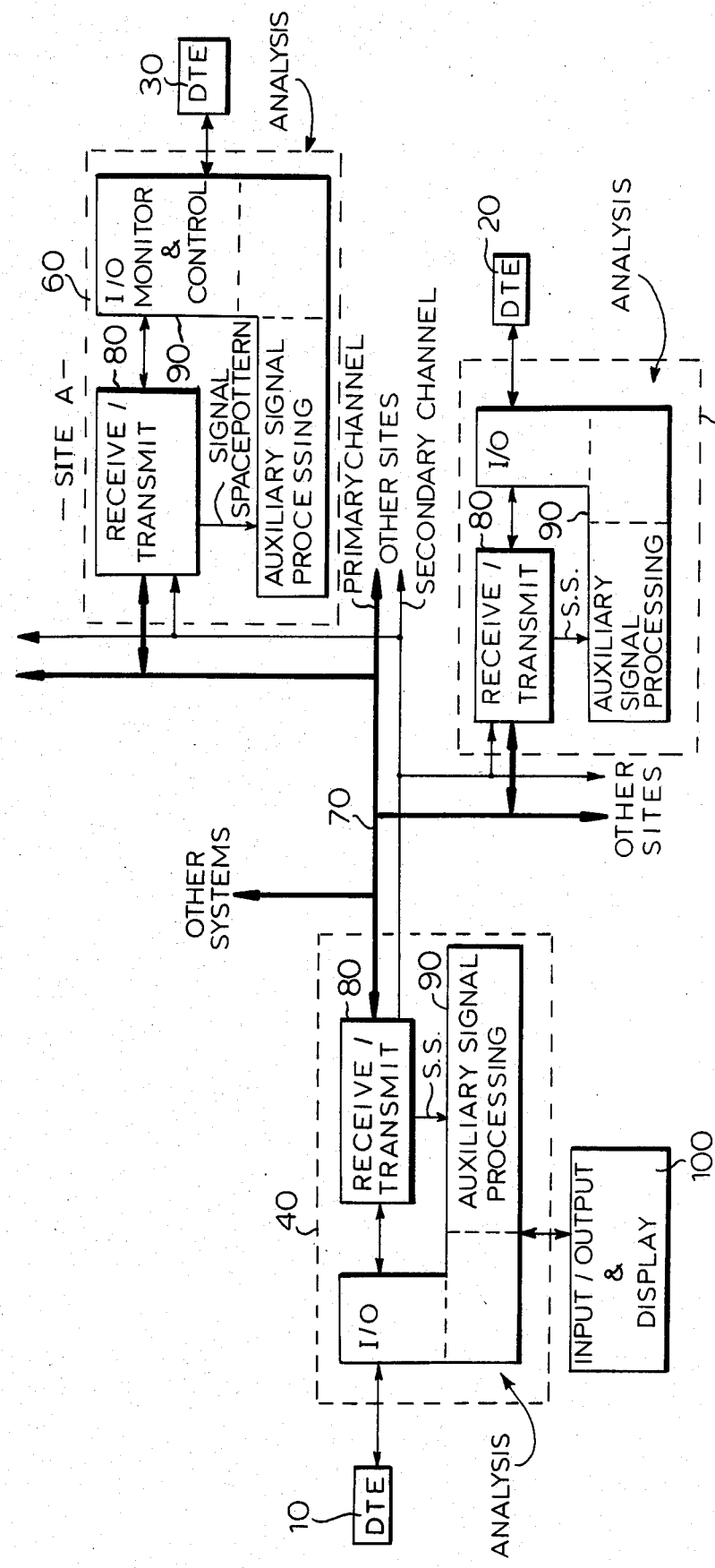
FIG. 1 show a typical multipoint modem network incorporating the present invention.

A data communications line incorporating monitoring equipment is shown in FIG. 1 and it comprises data terminal equipment (DTE's) 10,20, and 30, modem systems 40,50, and 60 connected to said DTE's and a communication link 70 with branches to said modem systems. DTE 40, for example, could be a master site which sends and receives data from a plurality of remote sites such as A and B.

Each modem system comprises receive-and-transmit communication equipment 80 and auxiliary signal processing equipment 90. The auxiliary processing equipment performs two functions. It transfers data between DTE 10 and the communication equipment 80; and it monitors the characteristics or status of the communications link 70, as well as the communications equipment 80. This later function is more fully described in application Ser. No. 376,741 filed May 10, 1982 now U.S. Pat. No. 4,516,216. The information derived by the auxiliary processing equipment is transferred for display to display means 100.

Figure 2:
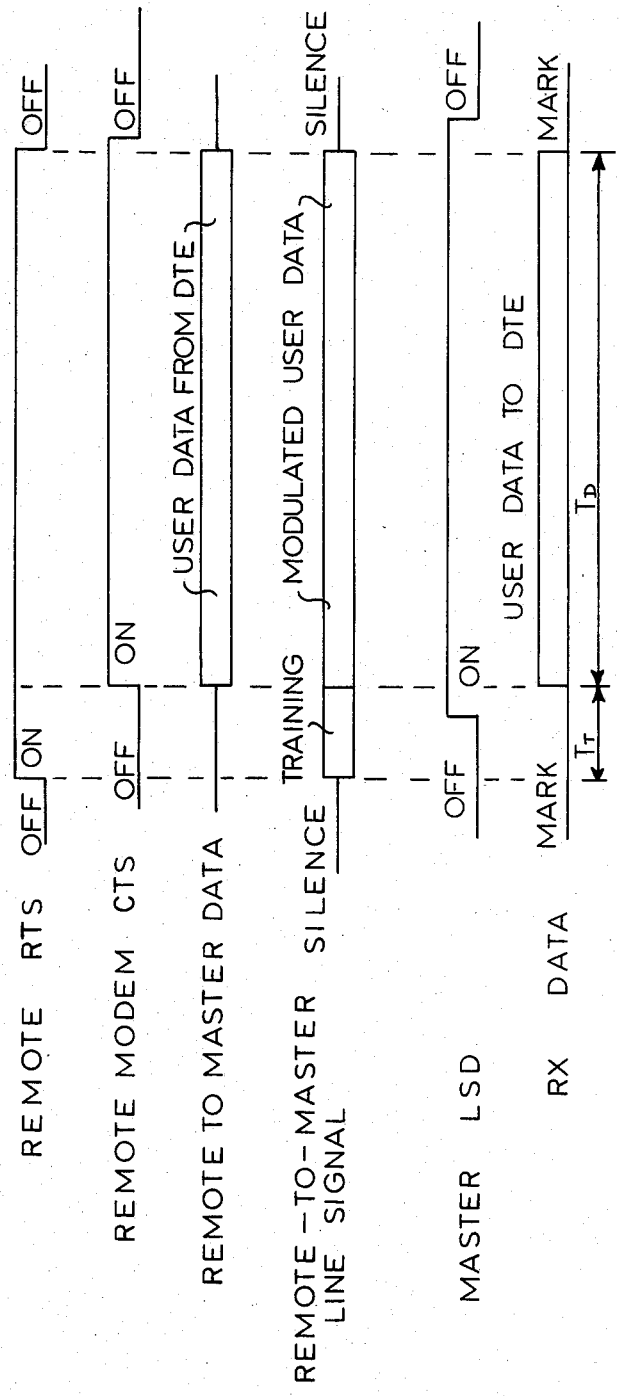
FIG. 2 shows by way of example certain prior art standard control signals of a data communication system.
Figure 3:
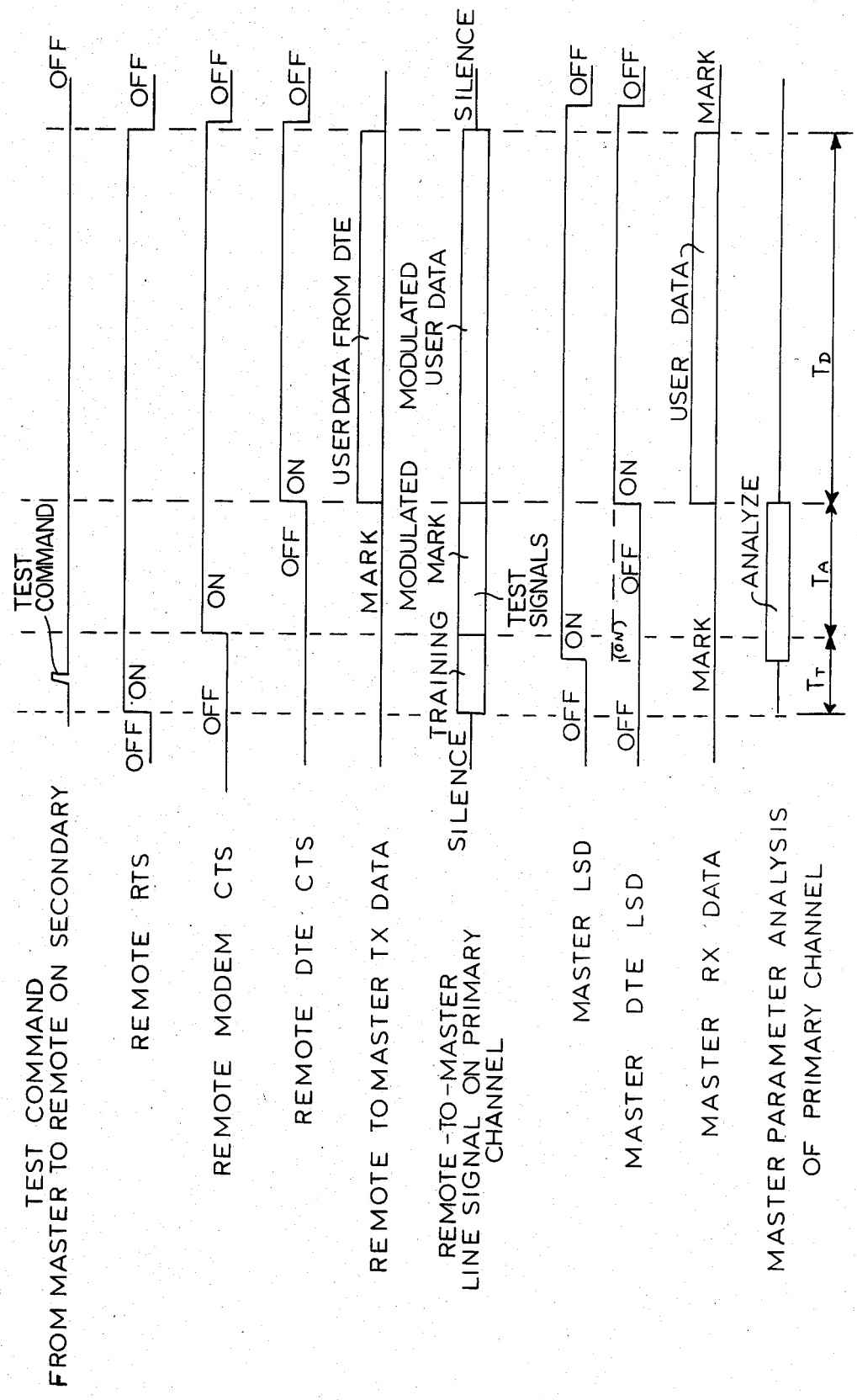
FIG. 3 shows the control signals of a data communication system modified by the present invention.

The operation of modems has been prescribed by national and international organizations (E.I.A. and C.C.I.T.T.) and has become fairly standard. As illustrated by the signals shown in FIGS. 2 and 3, data transmission may be initialized by remote DTE 30 by turning its READY-TO-SEND (RTS) control line ON. The remote modem system then starts a training period Tt during which it sends training signals to the master modem system 40 via link 70. During this training period, the master modem receiver system in effect adjusts some of its internal parameters to insure an acceptable data exchange. For example Automatic Gain Control (AGC) levels are established, baud timing loop synchronization and carrier frequency loop synchronization is achieved, etc. In automatically equalized modems, it is usual that equalization take place during the training period. Typically these training periods in equalized modems are between 20 and 50 msec long and in unequalized modems between 7 and 10 msec.

After the training period is over, the remote modem system 60 sends a CLEAR-TO-SEND (CTS) signal to its DTE 30 which can now send data to the remote modem 60 for transmission. Data transmission typically persists for a period Td of 13 to 2,000 msec.

At the master modem a line signal detect (LSD) line is energized to DTE 10 immediately before the end of the training period and received data (RX DATA) is sent to DTE 10 during the Td.

In the present invention, after the training period Tt has been initiated, the master modem 80 sends a TEST command to the respective remote modem. Preferably this TEST command is sent over a secondary channel such as the one described in the commonly assigned co-pending application Ser. No. 453,165, filed on Dec. 27, 1982 now U.S. Pat. No. 4,525,846. In response to this command, the addressed remote modem 60, after the completion of the training period Tt, initiates a series of TEST signals for a period Ta. Preferably these test signals consist of unscrambled repetive signals, selected to eliminate intersymbol interference between any two consecutive test signals. For example the test signals could consist of a series of "1"'s. Since no equalization is necessary the auxiliary processing equipment is able to make its analysis during period Ta. If the modems are equipped with scramblers, the TEST signals generated by the remote modem must be compatible with the scrambler system to produce the required unscrambled output. The length of period Ta depends on a number of factors such as the desired accuracy and reliability of the measurements, and allowable user system delay. Ta may, for example, range from 13 to 106 msec, which corresponds to 16–128 symbols for a 1200 baud modem.

After the test period Ta, the transmission of the actual DTE data may start and the systems operate in the normal manner.

It is contemplated that during the test period Ta remote modem 60 keeps the CTS line to DTE 30 off to inhibit data sending. However in a system where the DTE sends data to its modem, regardless of the status of CTS, any data sent during Ta must be stored. In multipoint networks the master modem sequentially receives data from multiple modems. In order to initiate the TEST period, Ta, the master modem sends out a TEST A command to remote modem A (60) over secondary channel which solicits a response from only modem 60. When the master modem system receives an uninterrupted string of MARKS on a channel following the training sequence it automatically starts analyzing the channel characteristics.

It would be obvious to one skilled in the art that the method presented herein can be modified without departing from the scope of the invention as defined in the appended claims.

What is claimed is:

1. In a data communication system for exchanging data signals between a first and a second modem over a primary communication channel, each data transmission being initiated by a training period, a method of measuring characteristics of the primary communication channel comprising:
    (a) sending a test command from said first modem to the second modem over a secondary channel, said second modem in response to said test command sending test signals to said first modem over said primary channel after completion of the training period and preceding the data transmission in said first modem, said test signals being identical and spaced to eliminate intersymbol interference between consecutive signals;
    (b) receiving said test signals at said first modem, and;
    (c) analyzing said received test signals for signal-to-noise ratio and phase jitter to determine the characteristics of said primary channel whereby no equalization of said test signals is necessary.

2. The method of claim 1 wherein a plurality of remote modems are provided, and each is linked to said first modem with a respective primary and secondary channels.

* * * * *